United States Patent [19]

Vinouze et al.

[11] Patent Number: 5,617,231

[45] Date of Patent: Apr. 1, 1997

[54] DIFFUSING MATRIX LIQUID CRYSTAL DISPLAY SCREEN

[75] Inventors: Bruno Vinouze, Port-Blanc; Martine Guilbert, Trebfurden; Dominique Bosc, Lannion, all of France

[73] Assignee: France Telecom, Paris, France

[21] Appl. No.: 491,376

[22] Filed: Jun. 16, 1995

[30] Foreign Application Priority Data

Jun. 17, 1994 [FR] France .................................. 94 07450

[51] Int. Cl.⁶ .................................................. G02F 1/1343
[52] U.S. Cl. ............................................ 349/112; 349/110
[58] Field of Search .................................. 359/67, 68, 69, 359/70

[56] References Cited

U.S. PATENT DOCUMENTS

| | | | |
|---|---|---|---|
| 3,832,034 | 8/1974 | Edmonds | 359/87 |
| 4,824,213 | 4/1989 | Morokawa | 350/336 |
| 4,867,537 | 9/1989 | Aoki et al. | 359/88 |

FOREIGN PATENT DOCUMENTS

| | | |
|---|---|---|
| 0326248 | 8/1989 | European Pat. Off. . |
| 0328329 | 8/1989 | European Pat. Off. . |
| 2269314 | 11/1990 | Japan ........... 359/69 |
| 3256025 | 11/1991 | Japan ........... 359/70 |
| 2054935 | 2/1981 | United Kingdom . |

OTHER PUBLICATIONS

Patent Abstracts of Japan, vol 13, No. 324 (P–903), Jul. 21, 1989, JP-1-092722, Apr. 12, 1989.
Patent Abstracts of Japan, vol. 8, No. 17 (E–223), Jan. 25, 1984, JP-58-180053, Oct. 21, 1983.

*Primary Examiner*—William L. Sikes
*Assistant Examiner*—James A. Dudek
*Attorney, Agent, or Firm*—Oblon, Spivak, McClelland, Maier & Neustadt, P.C.

[57] ABSTRACT

A liquid crystal display screen which includes a first transparent plate covered with an electrode array and a second transparent plate covered with a counter-electrode. A liquid crystal film is inserted between the first and second plates. Further, either of the first or second transparent plates is covered with a material coating which diffuses ambient light with a brightness which exceeds a brightness of the liquid crystal film in the absence of excitation. This coating may take the form of a metal, a white mineral pigment or a polymer film which contains surface microcracks. Such a liquid crystal display screen as in the present invention may find particular applications to terminals, computers, pocket calculators, etc.

8 Claims, 3 Drawing Sheets

DIFFUSING MATRIX LIQUID CRYSTAL DISPLAY SCREEN

BACKGROUND OF THE INVENTION

1. Field of the Invention

The present invention relates to a diffusing matrix liquid crystal display screen, which screen according to the present invention can be used for terminals, computers, pocket calculators, etc.

2. Discussion of the Background

A display screen essentially comprises two transparent plates retaining between them an electrooptical material, e.g. a liquid crystal film. The attached FIGS. 1 and 2 show an embodiment having such plates.

In FIG. 1 is shown a transparent substrate 10, e.g. of glass, covered:

by a first series of addressing conductive strips 12 arranged in column form, e.g. of indium and tin oxide (ITO), by an array of electrodes 14, each constituting a display point or pixel, by a second series of addressing strips 16 arranged in row form and generally constituted by a stack of layers, namely a semiconductor layer (e.g. of aSi:H), an insulating layer (e.g. of SiN) and a conductive layer (e.g. of aluminum).

The electrodes 14 are extended by a finger 20 in such a way that the finger 20 and the column form a source and a drain of a thin film transistor, the gate being constituted by the metal coating of the addressing row.

FIG. 2 shows a second plate with a second transparent substrate 30 (e.g. of glass), blocks of light filters 32 (red, green, blue), a black matrix 34 and a conductive, transparent counter-electrode 36. The light filters 32 and black matrix 34 are not essential to the invention to be described hereinafter.

Such a screen, or at least the first plate illustrated in FIG. 1, can be obtained by a process requiring only two photolithography levels, such as described in FR-A-2 533 072.

Moreover, the known liquid crystal display screens (no matter whether they are or are not of the aforementioned type), may operate in a reflective mode. This means that the liquid crystals backscatter the ambient light in the absence of electrical excitation, but become transparent under excitation, allowing a black character to appear.

This operating mode leads to a display in black on a white background. This display is advantageous because it eliminates the rear illumination of the screen, which leads to a corresponding reduction in the electric power consumption of the screen.

The optical effect currently used for obtaining the reflection of the ambient light is linked with the properties of certain liquid crystals of the twisted nematic type used with a rear reflector. However, polymer dispersed liquid crystals (PDLC) are generally used for diffusing ambient light.

The use of twisted nematics requires the use of two polarizers, which absorb more than 505 of the incident light. The brightness (defined as the ratio of the backscattered intensity to the incident intensity) is consequently low. Brightnesses of approximately 5% are normally obtained, which is much too low for high definition displays for video applications. In addition, the contrast is low.

With polymer dispersed liquid crystals, the diffusion is essentially influenced by the optical anisotropy of the liquid crystal, the index of the polymer, the diameter of the liquid crystal droplets and the thickness of the cell. The backscattering of a liquid crystal cell dispersed in a polymer increases when the optical anisotropy of the liquid crystals increases, increases as the index of the polymer approaches the ordinary index of the liquid crystal and increases when the diameter of the drops decreases and when the thickness of the cell increases.

For a given material, e.g. the pair TL205 and PN393 manufactured by MERCK, the indices of the liquid crystal TL205 and the monomer PN393 are given once and for all. Moreover, the diameter of the droplets obtained after irradiation is also fixed to a value between 0.5 and 1 µm. Thus, there is only the thickness of the cell to act on the diffusion of the film of liquid crystals.

With a thickness of 8 µm, the brightness is 12%, whereas at 14 µm the brightness becomes 17%. However, this is obtained to the detriment of the control voltage. At 8 µm, the control voltage is 10 V and rises to close to 20 V for a 14 µm cell. However, the maximum voltage available at the terminals of a screen addressing circuit is approximately 12 V. It is consequently not possible to increase the thickness of the cell in order to increase the brightness of the screen, because this would require voltages beyond the available voltages.

SUMMARY OF THE INVENTION

Accordingly, one object of the present invention is to provide a novel diffusing matrix liquid crystal display which obviates the disadvantages in the conventional systems.

To achieve its objectives, the present invention makes use of the fact that in an active matrix display screen (e.g. according to that already described in FIGS. 1 and 2), the active surface, i.e. the surface of the electrodes, only represents 40 to 60% of the total surface of the screen. In order to improve the screen brightness, the present invention proposes covering the non-active surface of the screen with a coating whose brightness is greater than a brightness of the liquid crystals alone. The very bright, non-active surface will then reinforce the brightness of the relatively small, active surface. The black of such a screen will certainly be slightly less black than in a conventional screen, because the surface of the supplementary coating will still reflect light, but the brightness-contrast balance remains positive.

By analogy with the term black matrix used in the prior art, the diffusing coating used in the invention can be referred to as a white matrix.

More specifically, the present invention relates to a liquid crystal display screen which includes a first transparent plate covered with an electrode array, a second transparent plate covered with a counter-electrode, and a liquid crystal film diffusing ambient light in the absence of electrical excitation and transparent in the presence of electrical excitation, inserted between the first and second plates.

The display screen also has a material coating diffusing the ambient light with a brightness exceeding that of the liquid crystal film in the absence of excitation, the coating being deposited on one of the two plates and having openings corresponding to the electrodes of the first plate.

The diffusing material coating or white matrix of the present invention can be deposited on the first plate, around the electrodes. However, it can also be applied to the second plate, above or below the counter-electrodes, the openings in the coating then facing the electrodes of the first plate.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
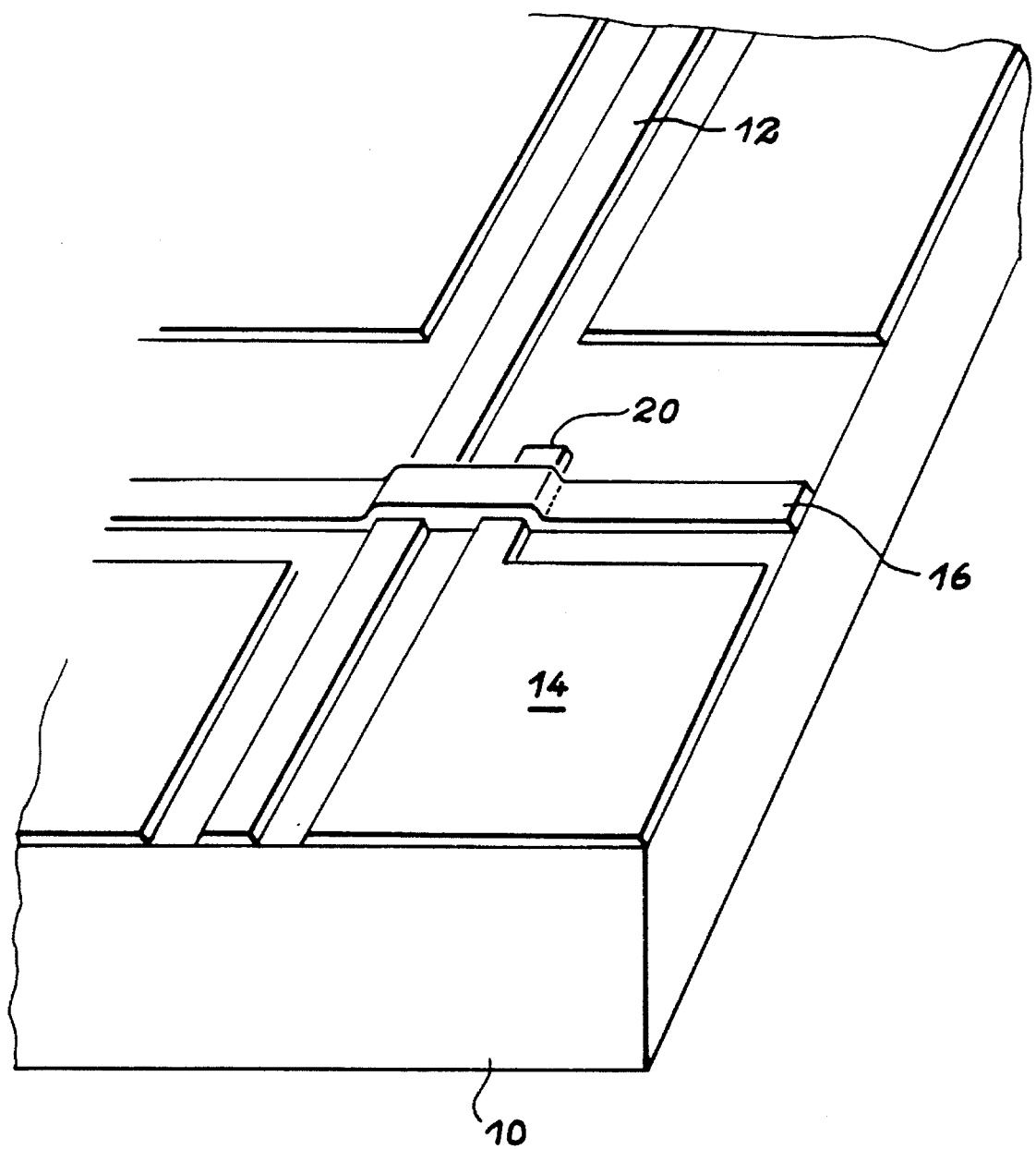
FIG. 1, already described, illustrates a first plate of a display screen of an active matrix type.
Figure 2:
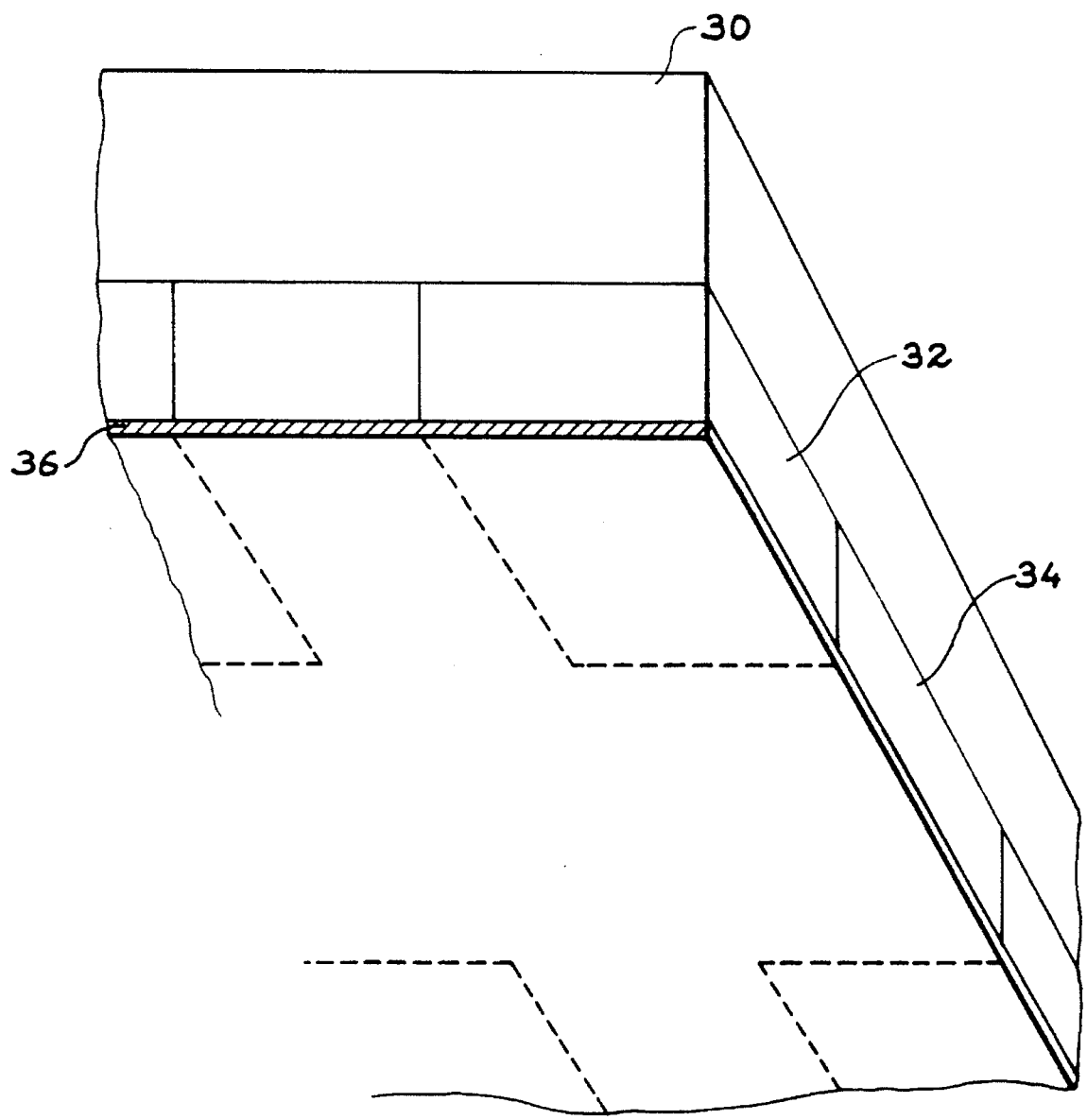
FIG. 2, already described, illustrates a second plate with a counter-electrode.
Figure 3A:
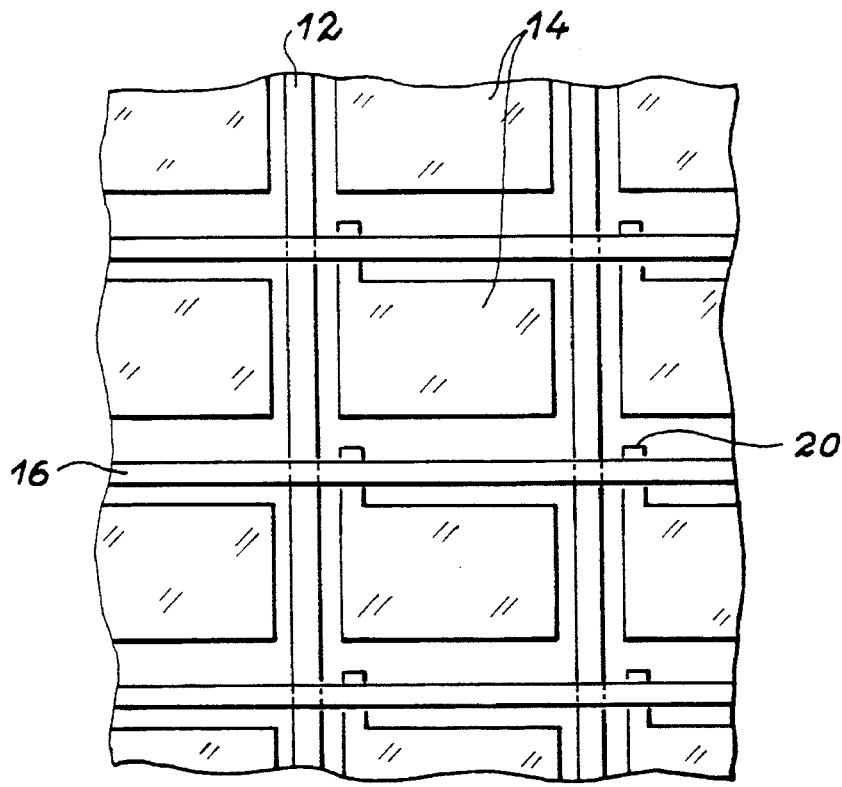
FIG. 3a shows, in plan view, a first plate with its electrodes.

Referring now to the drawings, wherein like reference numerals designate identical or corresponding parts throughout the several views, and more particularly to FIG. 3a thereof, there is shown a first plate according to FIG. 1, with its electrode array 14 and its addressing columns 12 and rows 16.

Figure 3B:
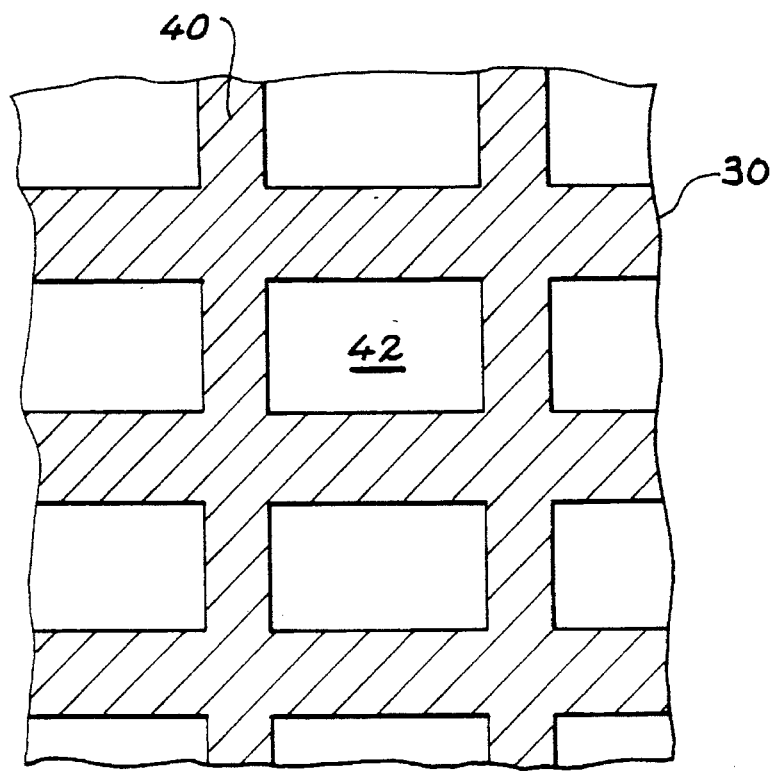
FIG. 3b shows a general form of a diffusing matrix according to the present invention.

FIG. 3b shows a diffusing coating 40 assumed to be deposited, in the illustrated embodiment, on a second plate 30 associated with the first plate of FIG. 3a. This coating 40 has openings 42, whose dimensions correspond to the electrodes 14 of the first plate (see FIG. 3a). Thus, the operation of the screen is not modified in the areas corresponding to the electrodes, but the brightness of the screen is considerably increased between these areas.

A description will now be given of certain procedures making it possible to produce the diffusing coating of the present invention. Two important characteristics of the coating will now be defined. The coating must not have any over-thickness, because this would increase the control voltages. The desired thickness is preferably equal to or below 1 micrometer, but certainly below 5 µm. This involves the use of carefully chosen methods and products (e.g. a thin film coating method and, in a case of a suspension, a grain size smaller than a thickness of the desired coating). The coating must also be very bright. An overall brightness of 50% to 80% is desirable. However, it must be ensured that the brightness exceeds 15%, because this level can be reached by a polymer dispersed liquid crystal.

At least three types of materials can be used which make it possible to fulfill these conditions: metal deposits; white mineral pigments; polymer films.

Metal deposits

Any type of metal can be used, e.g. aluminum, chromium, gold, silver and nickel, which has a good reflection coefficient for visible light. Aluminum is a good candidate from among these metals. It makes it possible to produce a screen, whose inherent backscattering is reinforced by the reflection of light towards the observer. With aluminum, the overall brightness of the screen reaches at least 20%.

It is desirable for the surface of the aluminum to be rough in order to avoid direct reflections. One method of achieving this includes depositing on the glass a 100 nm aluminum coating, followed by the etching of the coating and covering it with a 100 nm thick indium and tin oxide (ITO) coating. A reaction then occurs between the aluminum and the ITO, which makes the aluminum milky and diffusing. A slight etching of the aluminum prior to ITO deposition improves the appearance of the aluminum coating.

Coating based on mineral pigments

It is possible to use white mineral pigments dispersed in organic solvents containing a dissolved polymer, which serves as a binder. These pigments may be white mineral powders such as calcium, barium or magnesium sulphates or oxides such as titanium dioxide, or aluminas. These powders must have a very fine grain size compatible with the desired thicknesses. 1 to 200 g/l dispersions in solutions such as chlorine solvents or the like can be used with a whirler in order to produce a film on the electrode or the counter-electrode of the screen.

The coating is then finished by conventional etching methods. Thus, once the film has been spread on the chosen support, it is possible to deposit an aluminum film and then apply a positive resin, which forms a film spread over the entire surface. The entire surface is then irradiated through a mask corresponding to the surface of what is wished to maintain white. In the conventional manner, the resin is dissolved on the irradiated areas, allowing the aluminum to appear, which is eliminated therefrom by acid etching. The white coating is then removed from this part with an appropriate solvent. The resin is removed or stripped from the non-irradiated area. The aluminum then undergoes acid etching, so as to free the reticular white matrix.

Use of polymer films

One method includes producing polymer films, which are either naturally white, or are transparent and made white. In the first case, it is possible to use semicrystalline polymers such as polyethylenes, polypropylenes and certain fluorinated polyolefins.

In the case of transparent polymers, it is possible to make a film of such polymers white by chemical etching causing microcracks. This will have the effect of diffusing the light. The brightnesses obtained in this way can reach 50%.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A liquid crystal display screen comprising:

a first transparent plate covered with an electrode array of electrodes;

a second transparent plate covered with a counterelectrode;

a liquid crystal film diffusing ambient light in the absence of electrical excitation and transparent in the presence of electrical excitation, the liquid crystal film being inserted between the first and second plates; and a material coating diffusing the ambient light with a brightness exceeding a brightness of the liquid crystal film in the absence of excitation, said material coating being deposited on one of the first or second transparent plates and having openings corresponding to the electrodes of the first plate.

2. The display screen according to claim 1, wherein the material coating is deposited on the first plate between the electrodes of the electrode array.

3. The display screen according to claim 1, wherein the material coating is deposited on the counter-electrode of the second plate.

4. The display screen according to claim 1, wherein the material coating comprises a metal.

5. The display screen according to claim 4, wherein the metal is chosen from a group consisting of: aluminum; chromium; gold; silver; and nickel.

6. The display screen according to claim 5, wherein the material coating is an aluminum coating covered by a transparent tin and indium oxide coating.

7. The display screen according to claim 1, wherein the material coating incorporates a white mineral pigment dispersed in an organic solvent.

8. The display screen according to claim 1, wherein the material coating is a polymer film containing surface microcracks.

* * * * *